(No Model.) 2 Sheets—Sheet 1.
F. M. WILDER.
APPARATUS FOR HEATING RAILWAY CARS.
No. 397,161. Patented Feb. 5, 1889.
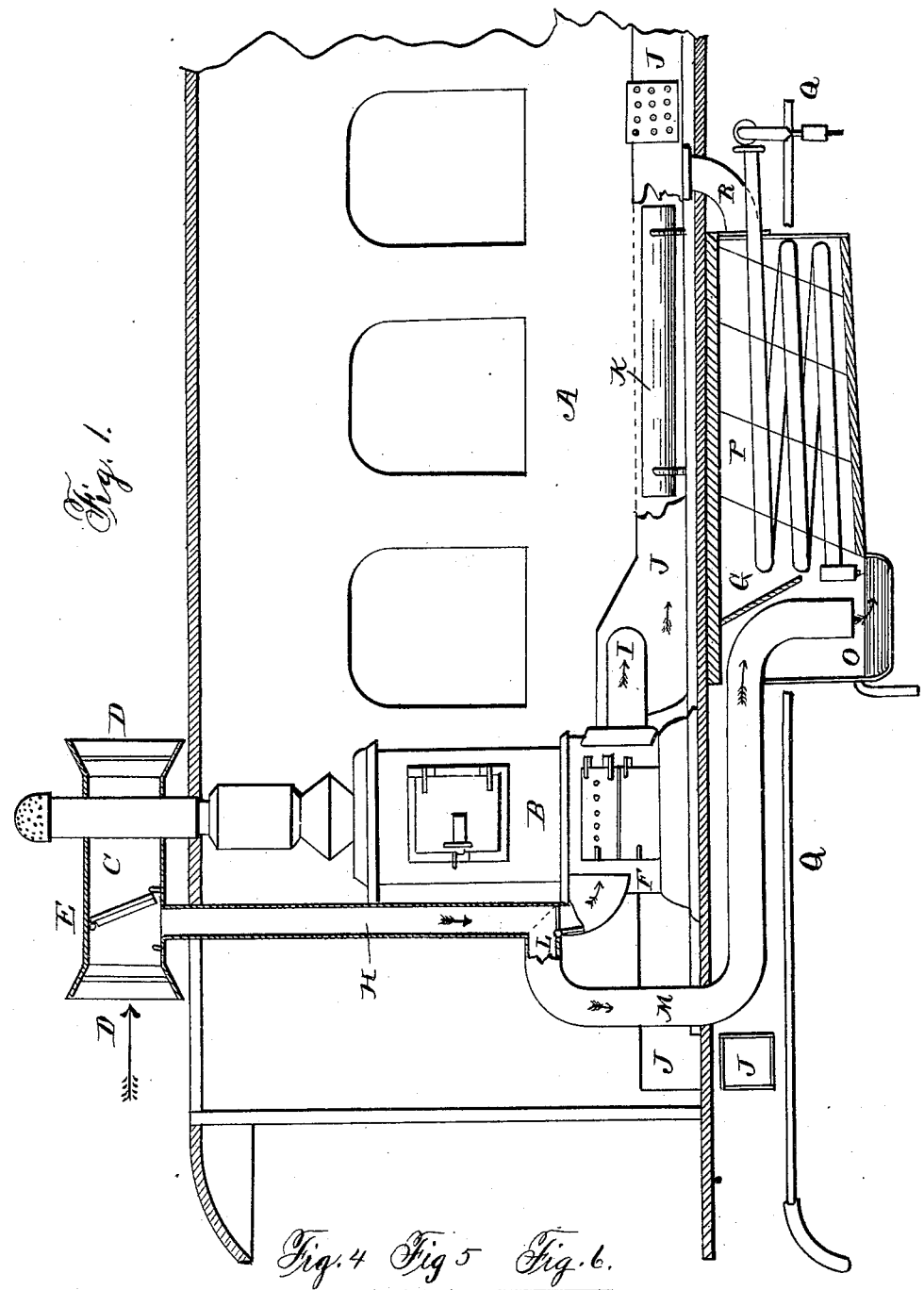
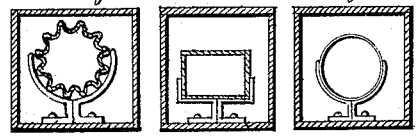
WITNESSES:
Ira R. Steward,
F. K. Budd.
INVENTOR
Francis M. Wilder
BY
Geo. H. Benjamin
ATTORNEY

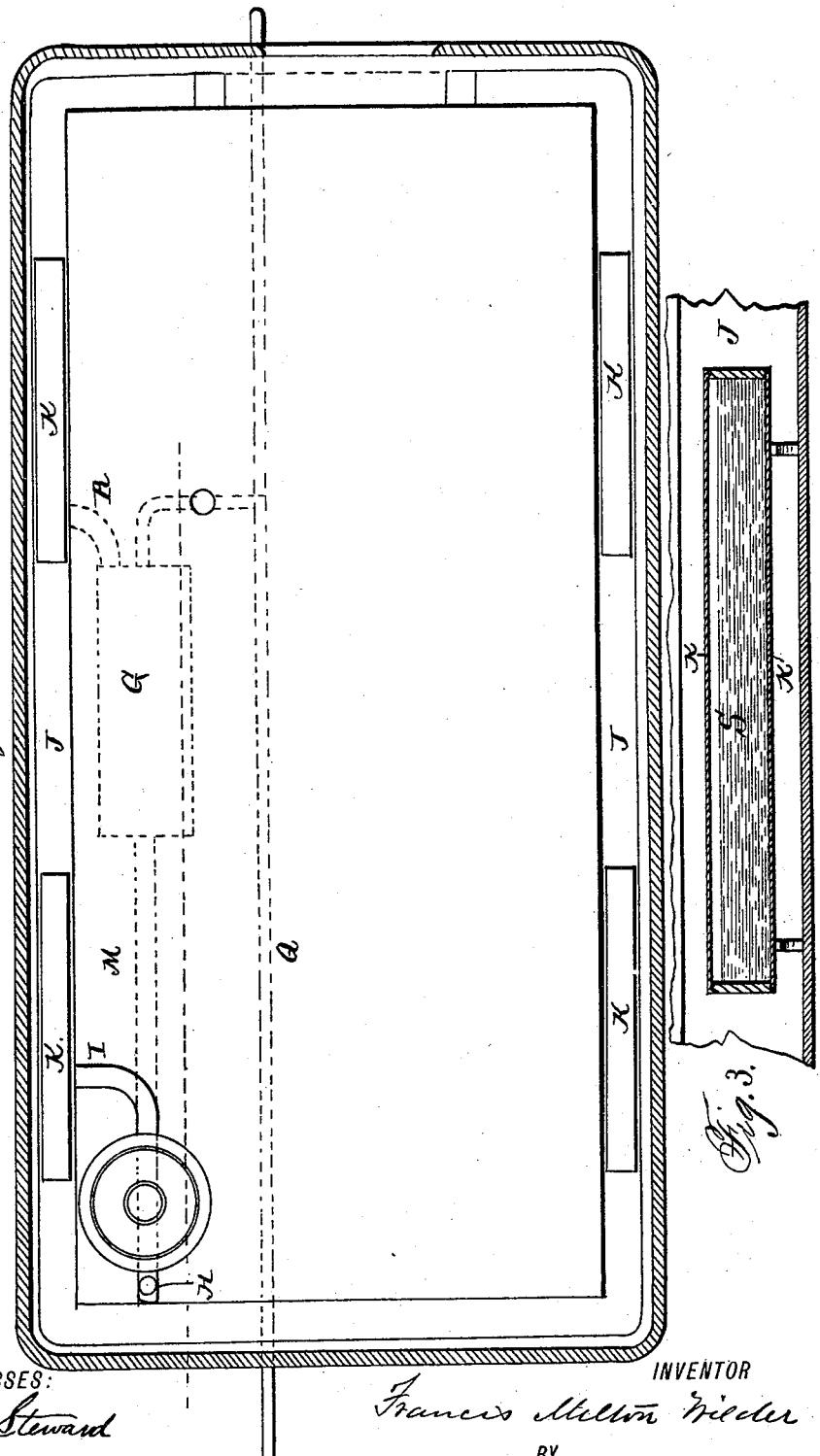

UNITED STATES PATENT OFFICE.

FRANCIS MILTON WILDER, OF BINGHAMTON, NEW YORK, ASSIGNOR, BY MESNE ASSIGNMENTS, TO THE SAFETY CAR HEATING AND LIGHTING COMPANY, OF NEW JERSEY.

APPARATUS FOR HEATING RAILWAY-CARS.

SPECIFICATION forming part of Letters Patent No. 397,161, dated February 5, 1889.

Application filed August 29, 1887. Serial No. 248,119. (No model.)

*To all whom it may concern:*

Be it known that I, FRANCIS MILTON WILDER, of Binghamton, in the county of Broome, State of New York, have invented certain new and useful Improvements in the Method of and Apparatus for Heating Railway-Cars, of which the following is a specification.

In a patent granted to me on June 28, 1887, and numbered 238,423, I have generally described a method of and apparatus for heating railway-cars, wherein the primary source of heat is derived from any suitable external source and the secondary or indirect source of heating is air heated from such primary source.

My present invention comprehends the combination, with such a system of heating, of a vessel or series of vessels located within a car containing a body of material capable of absorbing heat and of subsequently radiating the same. In other words, I combine with the air-heating system described a reservoir for heat from which the heat will be radiated when the primary source of heat is cut off—as, for instance, when a car is detached from the locomotive, from which the primary source of heat is derived.

In the accompanying drawings, which illustrate my invention, similar letters of reference indicate like parts.

Figure 1 is a vertical longitudinal section of a railway-car, and shows an air-heating drum under the car, the means by which the air and primary source of heat are brought to the drum, the heated air therefrom carried to the interior of the car and over the vessel within the car which contains the heat-absorbing material. Fig. 2 is a plan view showing the position of the drum under the car and the location of the storage-vessels within the car. Fig. 3 is a longitudinal vertical section of one of the air-ducts within the car and a storage-vessel within the duct, the said vessel containing a body of heat-absorbing liquid. Figs. 4, 5, and 6 are vertical transverse sections of air-ducts and storage-vessels therein, illustrating different shapes of the vessels which may be employed.

In the drawings, A indicates a car; B, a heater therein, which may be of any type designed to heat the air which is taken from the exterior of the car and when heated transmitted through air-ducts and arranged along the sides of the car or other required position.

On the top of the car is a hood, C, through which the air-induction currents are received.

D are screens in the hood for the interception of dust and cinders.

E is a pendent valve in the hood C, which acts automatically to direct incoming currents of air into the warming-chamber F of the stove B.

The currents of air enter the hood C, pass down the pipe H to the warming-chamber, thence by the pipe I to the air-ducts J, arranged along the sides of the car or other required position. When the car-stove is in operation, the direction of the incoming air is as described, and the air, in traversing the duct J, passes over the storage-vessels K, imparting a certain portion of its heat to the material within the drums K, which may be any material, liquid or solid, which will absorb heat. I may thus employ within the storage-drums a solid—such as the acetate of soda or potash, which is fluid at a high temperature—or I may use a solution of salt in water or a solution of any other salt, or simple water may be utilized. For all practical purposes a saturated solution of salt in water is all that is required, as it has a considerable capacity for absorbing heat and will not freeze at any temperature.

The drum I prefer to fill with a solution or material, to which it is likely to be subjected, to within approximately nineteen-twentieths of its capacity, the space left being sufficient to compensate for any expansion of the material within the vessel. When the stove is not in use, the valve L in the pipe H is turned into the position shown, and the currents of air are directed down the pipe H to the pipe M, and from thence into the drum G, impinging at the point of entrance into the drum upon a body of water, O, contained therein. The air entering the drum G is heated by the steam transmitted through the bench-radiator P, which is connected to the main steam-pipe Q. The air heated within the drum is directed upward by the pipe R, and enters the air-flues J within the car, passing over the storage vessels or reservoirs K in the same manner as when the heated air is derived from the stove B. The storage-vessels I have shown as located within the air-flues J, which are arranged along the sides of the car. I do not, however, limit myself to any particular location. The storage-vessels may be of any required shape. In Fig. 4 I have shown a corrugated vessel, in Fig. 5 a rectangular vessel, and in Fig. 6 a cylindrical vessel. The tanks should be preferably so arranged as to interfere as little as possible with currents of air transmitted through the air-ducts.

It will be understood that the stove or steam-drum may be operated independently of each other and the induction air-currents directed by the valve T in the pipe H.

I claim as my invention—

1. A car-heater comprising a stove within the car, an air-induction pipe, an eduction-pipe for the heated air, and one or more closed vessels containing a body of heat-absorbing material.

2. The combination, in a car-heater and with the air-heating drum thereof, of an air-induction pipe, an eduction-pipe for the heated air, and one or more closed vessels containing a body of heat-absorbing material.

3. A car-heater comprising a drum containing a steam-conveying pipe or pipes, a pipe or conduit for conveying air to the said drum, an air-flue connected to said drum and within the car for circulating the heated air, and a closed vessel or vessels containing a body of heat-absorbing material within said air-flue or flues.

4. A car-heater comprising a stove within a car, an air-heating drum independent of the stove, an air induction and eduction pipe connected to said stove and drum, and a closed vessel or vessels containing a heat-absorbing material, so located as to be heated by the heated air conveyed by the eduction-pipe.

5. A car-heater comprising a stove within a car, an air-heating drum independent of the stove, an air-induction and air-eduction pipe connected to said stove and drum, a closed vessel or vessels containing a heat-absorbing material, and a valve in the induction-pipe, whereby the stove or heating-drum may be operated independently of each other.

In witness whereof I have hereunto set my hand.

FRANCIS MILTON WILDER.

Witnesses:
IRA R. STEWARD,
JAMES T. FOGERTY.